April 22, 1941.
W. F. FISCHER
2,238,933
CUTTING IMPLEMENT
Filed April 29, 1940
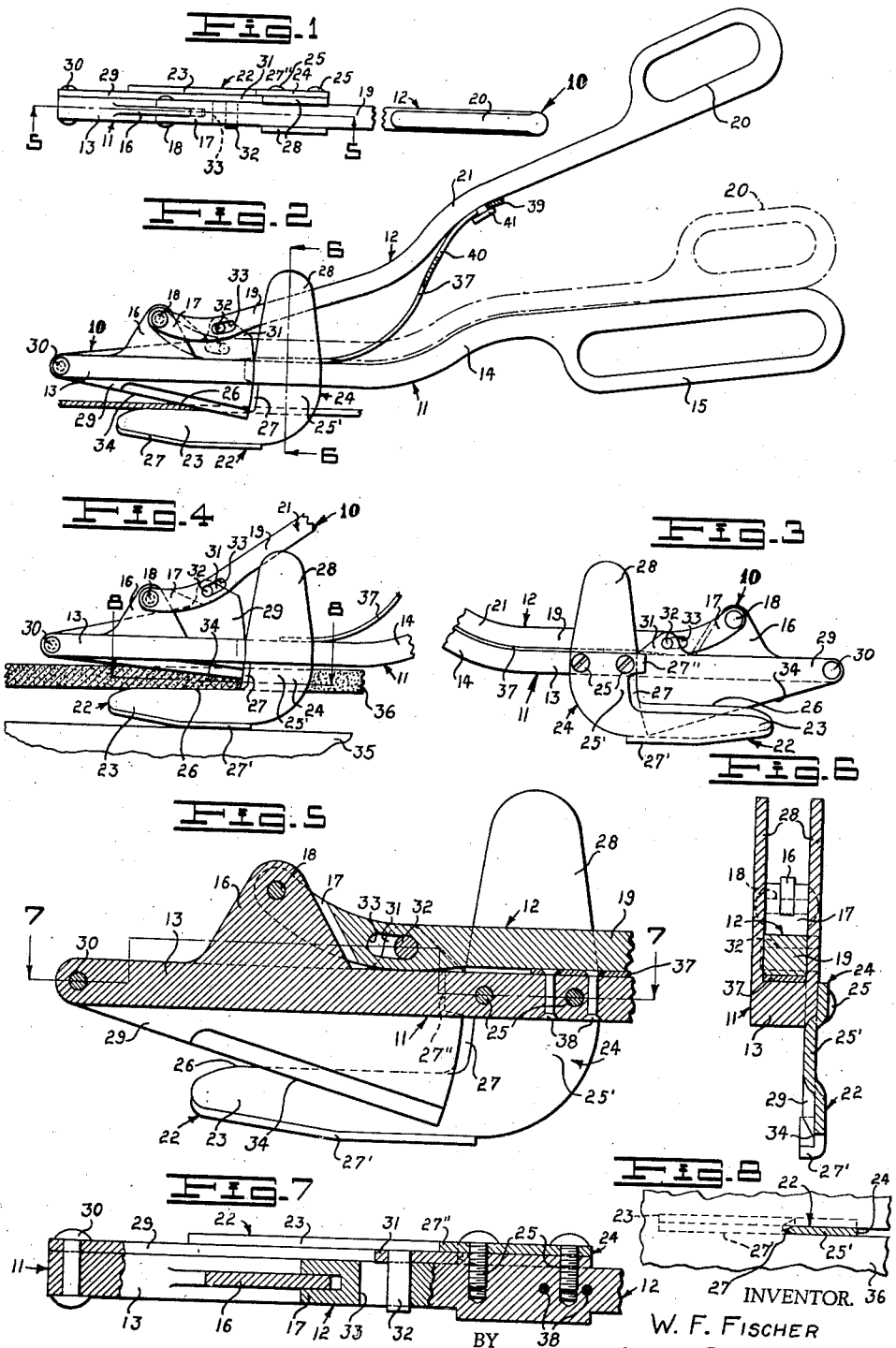
INVENTOR.
W. F. FISCHER
BY
ATTORNEY.

Patented Apr. 22, 1941

2,238,933

UNITED STATES PATENT OFFICE 2,238,933

CUTTING IMPLEMENT

William F. Fischer, Altadena, Calif.

Application April 29, 1940, Serial No. 332,297

5 Claims. (Cl. 30—238)

This invention relates to cutting implements.

The general object of the invention is to provide an improved cutting implement for cutting tough, tenacious metal.

A more specific object of the invention is to provide a cutting implement in shear form which is adapted for either cutting plaster casts to remove them from the human body or for the purpose of cutting metal as in shear metal operations.

A more specific object of the invention is to provide a pair of cutting shears which have a novel mounting for the cutting blade.

Another object of the invention is to provide a pair of cutting shears including a novel construction whereby the cutting blade clears the path so that the shears can pass through the material being cut.

Another object of the invention is to provide a novel combined cutting blade and guide.

A further object of the invention is to provide a novel spring means for forcing one element of a cutting member away from the other element.

Other objects and the advantages of this invention will be apparent from the following description taken in connection with the accompanying drawing, wherein:

Fig. 1 is a fragmentary top plan view showing a cutting implement embodying the features of my invention;

Fig. 2 is a side elevation of the implement showing it in open position and showing the upper handle in broken line position when closed;

Fig. 3 is a fragmentary side elevation showing one side of the front of the implement;

Fig. 4 is a view similar to Fig. 3 showing the other side of the implement and showing it in the act of cutting a plaster case;

Fig. 5 is a fragmentary section taken on line 5—5, Fig. 1 and on an enlarged scale;

Fig. 6 is a fragmentary section taken on line 6—6, Fig. 2 and on an enlarged scale;

Fig. 7 is a fragmentary section taken on line 7—7, Fig. 5; and

Fig. 8 is a section taken on line 8—8, Fig. 4.

Referring to the drawing by reference characters I have shown my invention as embodied in a cutting implement, which is indicated generally as at 10. The implement includes a lower handle member 11 and an upper handle member 12. The lower handle member 11 includes a body portion 13, which is connected by a curved portion 14 to a finger grip portion 15. The body portion 13 includes an upstanding ear 16 which is shown as centrally disposed on the upper surface of the body. The upper handle member 12 includes a bifurcated forward end 17 which receives the ear 16 and is pivoted thereto by a fastening member 18 such as a rivet. The upper handle includes an intermediate body portion 19 which is connected to a thumb grip portion 20 by a curved portion 21.

Mounted on the lower body portion 13 I show a shear member 22 which includes a forwardly projecting portion 23 and an upwardly projecting portion 24. The shear member is held in place as by removable screw members 25 which permit the removal of the shear member for sharpening or replacement. The portion 24 is offset as at 25′ in alignment with a cutting blade to be later described (see Fig. 6). The shear member includes an upper cutting edge 26 which is spaced some distance below the portion 13 so that a wide notch is provided for the reception of the material to be cut.

The pivoted edge of the shear member portion 25′ is preferably beveled as at 27 on both sides so that as the shear member advances the edge 27 acts to part the material being cut to open the material for cutting action.

The shear member may further be provided with a rib 27′ which acts as a runner as well as a reinforcing member. A tongue 27″ is also provided which serves as a guide for a cutting blade to be later described (see Fig. 3).

The body portion 13 of the lower handle 11 further includes spaced upstanding tongues 28 integral therewith and adjacent the portion 24 of the shear 22. Said tongues are positioned one at each side of the body portion 13 of the lower handle to serve as guides.

A cutting blade 29 is pivoted at its forward end as at 30, to the forward end of the body portion 13 and at its rear end includes an upwardly projecting portion 31 on which a pin member 32 is mounted. This pin 32 extends through a slot 33 in the upper handle portion 19, and the construction is such that when the upper handle 12 is moved towards the lower handles 11 the pin 32 engaging the wall of the slot forces the cutting blade 29 downwardly so that the cutting action takes place between the lower sharpened edge 34 of the cutting blade and the cutting edge 26 of the shear member when thin material is to be cut. The cutting blade is aligned with the portion 25′ previously mentioned.

When thick material is to be cut as shown in Fig. 4 the cutting edge 34 performs the cutting operation and merely presses the material down upon the portion 23 of the shear member 22.

My invention is adapted for use in cutting thin materials during which operation it performs the cutting act by assuming the positions shown in Fig. 2, while for thick materials the Fig. 4 position is assumed.

My implement is particularly adapted for cutting plaster casts such as used by surgeons so that the cast can be removed from the patient. In Fig. 4 a portion of the body is indicated at 35 and the cast at 36 and in cutting it will be noted that the portion 27 is disposed in the cut portion and serves to space the edges of the cutting portion as the implement is advanced.

In order to move the handles 11 and 12 apart I show a spring 37 which is suitably secured as by rivets 38 to the lower handle and has a free end 39 with a slot 40 therein which slidably receives a pin 41 on the upper handle member. The opening engages the under surface of the upper handle in sliding relation and the tendency of the spring is to force the handles apart until the pin engages the end of the slot. This occurs when the cutting edge is first leaving the shear edge 26. Further opening of the handle requires that the spring 39 be straightened.

It will be noted that the faces of the offset portion 25' are in alignment with the sides of the cutting blade.

It will be understood that the foregoing description is that of one embodiment of my invention and that various changes can be made within the scope of the following claims.

From the foregoing it will be apparent that I have invented a novel cutting implement which can be economically manufactured and which is highly efficient for its intended purpose.

Having thus described my invention I claim:

1. In a cutting implement, a lower handle member having an upstanding ear thereon, an upper handle member pivotally mounted on said ear, said lower handle member having aligned spaced tongues thereon for guiding said upper handle member, a shear member on said lower handle member and including a forwardly projecting sharpened portion spaced from said lower handle and an upwardly directed portion, said upwardly directed portion including a forward edge adapted to hold the cut material from the cutting blade and shear member, and a cutting blade pivotally mounted at its extreme forward end on the extreme forward end of the lower handle member, said cutting blade including an upwardly projecting portion having a pin thereon, said upper handle member having an elongated slot receiving said pin, said cutting blade having a lower cutting edge disposed adjacent said shear member.

2. In a cutting implement, a lower handle member having a gripping portion at one end and having an upstanding ear spaced from the other end, an upper handle member, means to pivotally support the forward end of said upper handle on said ear, said upper handle having a gripping portion remote from said ear, said lower handle member having aligned spaced tongues thereon, said tongues being disposed one on each side of said upper handle member to guide the latter, a shear member, said shear member including a forwardly projecting portion and an upwardly directed portion, means to removably secure said upwardly directed portion to said lower handle member, said upwardly directed portion including a forward bevelled edge adapted to hold the cut material from the cutting blade and shear member, said forwardly projecting portion having a sharpened upper edge spaced from the lower handle member and having a lower stiffening and guiding flange thereon and a cutting blade pivotally mounted at its extreme forward end on the extreme forward end of the lower handle member, said cutting blade including an upwardly projecting portion having a pin thereon, said upper handle member having an elongated slot receiving said pin, said cutting blade having a lower cutting edge disposed adjacent said shear member and movable across the shear member to produce the cutting action.

3. In a cutting implement, a lower handle member having an upstanding ear thereon, an upper handle member, means to pivotally support the forward end of said upper handle on said ear, said lower handle member having aligned spaced tongues thereon, said tongues being disposed one on each side of said upper handle member to guide the latter, a shear member, said shear member including a forwardly projecting portion and an upwardly directed portion, means to removably secure said upwardly directed portion to said lower handle member, said upwardly directed portion including a forward bevelled edge adapted to hold the cut material from the cutting blade and shear member, said forwardly projecting portion having a sharpened upper edge spaced from the lower handle member and a cutting blade pivotally mounted at its extreme forward end on the extreme forward end of the lower handle member, said cutting blade including an upwardly projecting portion having a pin thereon, said upper handle member having an elongated slot receiving said pin, said cutting blade having a lower cutting edge disposed adjacent said shear member.

4. In a cutting implement, a lower handle member having a gripping portion at one end and having an upstanding ear spaced from the other end, an upper handle member, means to pivotally support the forward end of said upper handle on said ear, said upper handle having a gripping portion remote from said ear, tongues on said lower handle member to guide the upper handle member, a shear member, said shear member including a forwardly projecting portion and an upwardly directed portion, means to removably secure said upwardly directed portion to said lower handle member, said upwardly directed portion including a forward bevelled edge adapted to hold the cut material from the cutting blade and shear member, said forwardly projecting portion having a sharpened upper edge spaced from the lower handle member and a cutting blade pivotally mounted at its extreme forward end on the extreme forward end of the lower handle member, said cutting blade including an upwardly projecting portion having a pin thereon, said upper handle member having an elongated slot receiving said pin, said cutting blade having a lower cutting edge disposed adjacent said shear member and movable across the shear member to produce the cutting action.

5. In a cutting implement, a lower handle member, an upper handle member pivotally mounted on said lower handle member, said lower handle member having means thereon for guiding said upper handle member, a shear member on said lower handle member, said shear member including a forwardly projecting sharpened portion spaced from said lower handle and also including an upwardly directed portion, a cutting blade pivotally mounted, its extreme forward end on the forward end of said lower handle member, said cutting blade having a pin thereon, and said upper handle member having an elongated slot, slidably receiving said pin.

WILLIAM F. FISCHER.